United States Patent [19]

Akiyama

[11] Patent Number: 5,630,357
[45] Date of Patent: May 20, 1997

[54] DISPENSER FOR FOODS OR DRINKS

[75] Inventor: Mineo Akiyama, Tokyo, Japan

[73] Assignee: Robotex, Inc., Tokyo, Japan

[21] Appl. No.: 599,589

[22] Filed: Feb. 9, 1996

[30] Foreign Application Priority Data

Apr. 4, 1995 [JP] Japan .................... 7-078607

[51] Int. Cl.⁶ ............................................ A23L 1/18
[52] U.S. Cl. ................ 99/323.6; 99/290; 99/323.7; 99/357; 99/484; 221/150 A
[58] Field of Search .................. 99/323.4–323.9, 99/290, 357, 484, 407; 221/150 HC, 150 R, 254, 150 A; 222/1, 146.5, 158, 361; 219/386, 400; 280/47.35, 79.11

[56] References Cited

U.S. PATENT DOCUMENTS

| D. 309,919 | 8/1990 | Byrley | 99/323.9 X |
|---|---|---|---|
| 3,628,447 | 12/1971 | Levenback | 219/386 X |
| 3,641,916 | 2/1972 | McDevitt et al. | 99/323.7 |
| 3,748,437 | 7/1973 | Keeshin et al. | 99/483 |
| 4,171,667 | 10/1979 | Miller et al. | 221/254 X |
| 4,783,582 | 11/1988 | Wada et al. | 99/357 X |
| 4,828,146 | 5/1989 | Stein | 222/1 |
| 4,886,286 | 12/1989 | Whorton, III | 280/47.35 |
| 4,899,908 | 2/1990 | Kardiak | 222/1 |
| 5,035,173 | 7/1991 | Stein et al. | 99/323.7 |
| 5,154,113 | 10/1992 | Marquez | 99/357 X |
| 5,309,825 | 5/1994 | Pinone | 99/323.6 |
| 5,419,238 | 5/1995 | McKee et al. | 221/150 A |

FOREIGN PATENT DOCUMENTS

3281791 5/1993 Japan.

Primary Examiner—Timothy F. Simone
Attorney, Agent, or Firm—Oppedahl & Larson

[57] ABSTRACT

A doll controlling device controls a doll driving device to make a doll carry out movement for selling foods or drinks. A releasing device releases one of foods or drinks from a food or drink harvesting device when the releasing device is supplied with a money receipt signal and a selecting signal. A sound producing device produces sounds which are useful for selling foods or drinks. The dispenser for foods or drinks selling device may further comprise a cooking device for cooking foods or drinks from the harvesting device.

6 Claims, 4 Drawing Sheets

DISPENSER FOR FOODS OR DRINKS

BACKGROUND OF THE INVENTION

1. Field of the Invention

This invention relates to a dispenser for foods, such as popcorn, or drinks.

2. Description of the Prior Art

Conventionally, a dispenser for foods or drinks is known which is adapted to generate synthetic sounds or voices and to dispense foods or drinks, which are selected according to a consumer's operation, through a spout.

A variety of dispensers with synthetic sound-generating functions have, however, been recently distributed, and therefore it is impossible for a dispenser with a synthetic sound-generating function alone to have superiority to competitors' dispensers, making it difficult to promote sales of such a dispenser.

Further, a popcorn dispenser which requires a waiting time for cooking makes a consumer feel ennui until he receives the food.

Robotic dolls are well known, and have been used in amusement parks, as movie characters and as toys. Such dolls comprise an outer shell with the desired physical appearance and a doll driving mechanism consisting of a series of pistons, gears, actuators, rods, cables and similar parts which move the parts of the doll. The driving mechanism is controlled by a controlling device in the form of a computer processor which activates selected portions of the mechanism in response to predefined signals received from an exterior source. Examples of such doll driving devices, or of controlling devices can be found, for example, in JP 5-115622 published May 14, 1993 which is incorporated herein by reference.

SUMMARY OF THE INVENTION

It is an object of this invention to provide a dispenser for foods or drinks, which is capable of preventing a consumer from feeling ennui until he receives the food or the drink, thereby contributing to sales promotion of the dispenser.

According to a first aspect of this invention, there is provided a dispenser for foods or drinks comprising: a doll movable for selling foods or drinks; a doll driving device coupled to the doll for driving the doll; a controlling device connected to the doll driving device for controlling the doll driving device to make the doll carry out movements for selling the foods or drinks; money receiving means for receiving money to produce a money receipt signal; food or drink harvesting means for harvesting the foods or drinks; a selecting device for producing a selecting signal which selects one of the foods or drinks; a food or drink releasing device connected to the money receiving means, the food or drink harvesting means, and the selecting device, for releasing the selected one of the foods or drinks from the food or drink harvesting means when the food or drink releasing device is supplied with the money receipt signal and the selecting signal; and a sound producing device for producing sounds of a voice which are useful for selling the foods or drinks.

According to a second aspect of this invention, there is provided a dispenser for foods or drinks comprising: a doll movable for selling foods or drinks; a doll driving device coupled to the doll for driving the doll; a controlling device connected to the doll driving device for controlling the doll driving device to make the doll carry out movement for selling the foods or drinks; money receiving means for receiving money to produce a money receipt signal; food or drink harvesting means for harvesting the foods or drinks; a selecting device for producing a selecting signal which selects one of the foods or drinks; a cooking device connected to the money receiving means, the food or drink harvesting means, and the selecting device for cooking the selected one of the foods or drinks from the food or drink harvesting means when the cooking device is supplied with the money receipt signal and the selecting signal; a packing device connected to the cooking device for packing the selected one of the foods or drinks from the cooking device into a package as a packed food or drink; a food or drink releasing device connected to the packing device for releasing the packed food or drink from the packing device, and a sound producing device for producing sounds of a voice which are useful for selling the foods or drinks.

According to a third aspect of this invention, there is provided a dispenser for foods or drinks comprising: a doll driving device coupled to the doll for driving the doll; a person sensing device for sensing a person in a predetermined area to produce a sensed person signal; a controlling device connected to the doll driving device and the sensed person device for controlling the doll driving device to make the doll face the person in response to the sensed person signal and to make the doll carry out movements for selling the foods or drinks; money receiving means for receiving money to produce a money receipt signal; food or drink harvesting means for harvesting the foods or drinks; a selecting device for producing a selecting signal which selects one of the foods or drinks; a food or drink releasing device connected to the money receiving means, the food or drink harvesting means, and the selecting device for releasing the selected one of the foods or drinks from the food or drink harvesting means when the food or drink releasing device is supplied the money receipt signal and the selecting signal; and a sound producing device for producing sounds of a voice which are useful for selling the foods or drinks.

According to a fourth aspect of this invention, there is provided a dispenser for foods or drinks comprising: a doll movable for selling foods or drinks; a doll driving device coupled to the doll for driving the doll; a person sensing device for sensing a person in a predetermined area to produce a sensed person signal; a controlling device connected to the doll driving device and the person sensing device for controlling the doll driving device to make the doll face the person in response to the sensed person signal and make the doll carry out movements for selling the foods or drinks; money receiving means for receiving money to produce a money receipt signal; food or drink harvesting means for harvesting the foods or drinks; a selecting device for producing a selecting signal which selects one of the foods or drinks; a cooking device connected to the money receiving means, the food or drink harvesting means, and the selecting device for cooking the selected one of the foods or drinks from the food or drink harvesting means when the cooking device is supplied with the money receipt signal and the selecting signal; a packing device connected to the cooking device for packing the selected one of the foods or drinks from the cooking device into a package as a packed food or drink; a food or drink releasing device connected to the packing device for releasing the packed food or drink from the packing device; and a sound producing device for producing sounds of a voice which are useful for selling the foods or drinks.

According to a fifth aspect of this invention, there is provided a popcorn dispenser comprising: a doll movable for selling popcorn; a doll driving device coupled to the doll for driving the doll; a controlling device connected to the doll driving device to make the doll carry out movements for selling popcorn; money receiving means for receiving money to produce a money receipt signal; corn harvesting means for harvesting corn; a selecting device for producing a selecting signal which selects popcorn having one of several flavors; a cooking device connected to the money receiving means, the corn harvesting means, and the selecting device for cooking corn from the corn harvesting means to make selected popcorn having the flavor which is selected by the selecting device when the cooking device is supplied with the money receipt signal and the selecting signal; a packing device connected to the cooking device for packing the selected popcorn from the cooking device into a package as a packed popcorn; a popcorn releasing device connected to the packing device for releasing the packed popcorn from the packing device; and a sound producing device for producing sounds of a voice which are useful for selling the popcorn.

According to a sixth aspect of this invention, there is provided a popcorn dispenser comprising: a doll movable for selling popcorn; a doll driving device coupled to the doll for driving the doll; a person sensing device for sensing a person in a predetermined area to produce a sensed person signal; a controlling device connected to the doll driving device and the sensed person device for controlling the doll driving device to make the doll face the person in response to the sensed person signal and to make the doll carry out movement for selling the popcorn; money receiving means for receiving money to produce a money receipt signal; corn harvesting means for harvesting corn; a selecting device for producing a selecting signal which selects popcorn having one of several flavors; a cooking device connected to the money receiving means, the corn harvesting means, and the selecting device for cooking corn from the corn harvesting means to make selected popcorn having the flavor which is selected by the selecting device when the cooking device is supplied with the money receipt signal and the selecting signal; a packing device connected to the cooking device for packing the selected popcorn from the cooking device into a package as a packed popcorn; a popcorn releasing device connected to the packing device for releasing the packed popcorn from the packing device; and a sound producing device for producing sounds of a voice which are useful for selling the popcorn.

The above and other objects, features and advantages of the invention will be more apparent from the following detailed description taken in conjunction with the accompanying drawings.

DETAILED DESCRIPTION OF THE INVENTION

The invention will now be described in detail with reference to drawings showing a preferred embodiment thereof.

Figure 1:
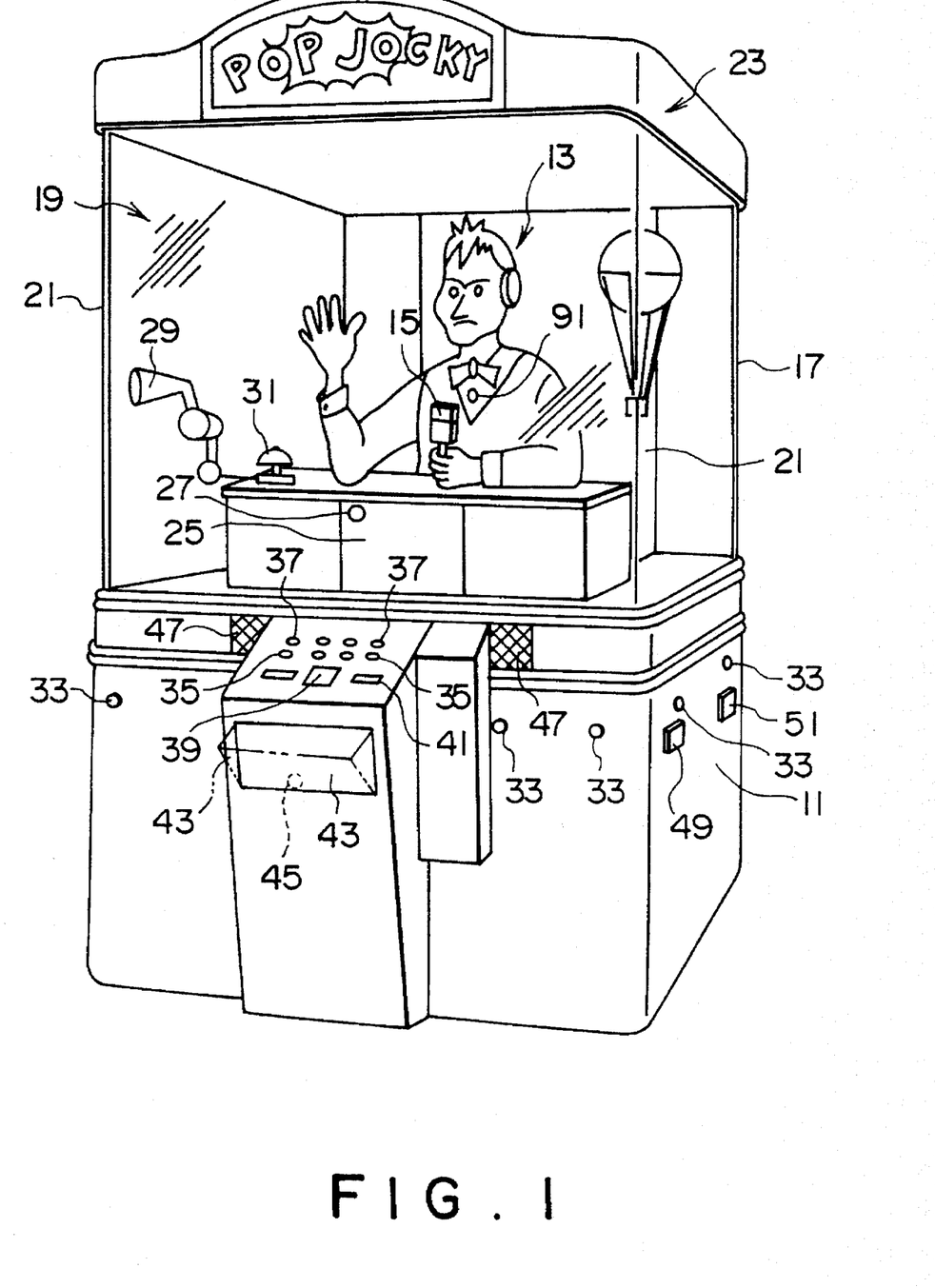
FIG. 1 is a perspective view of a dispenser according to an embodiment of this invention, which is applied to a popcorn dispenser.

Referring first to FIG. 1, there is illustrated a dispenser according to an embodiment of the invention, which is applied to a popcorn dispenser.

As shown in the figure, the dispenser according to the embodiment comprises a case 11 and a doll 13 mounted on the case 11. For example, the doll 13 is a doll in the form of a disc jockey for performing predetermined actions. The doll 13 is movable for selling popcorn. The doll 13 has eyes which move in upward, downward, leftward and rightward directions, a mouth which opens and closes, eyelids which open and close, a waist which moves in frontward, backward, leftward and rightward directions, a neck which move in frontward, backward, leftward and rightward directions, a shoulder, an elbow, a wrist and fingers which move in predetermined directions. The doll 13 has a toy mike 15 in his left hand.

A back plate 17 is mounted in an upright state on the case 11 and is located at the back of the doll 13. The back plate 17 is opaque. A front plate 19 and side plates 21 are mounted in upright states on the case 11. The front plate 19 is located in front of the doll 13 and is transparent. The side plates 21 are located on both sides of the doll 13 and are transparent. A roof 23 is mounted on the back plate 17, the front plate 19, and the side plates 21.

A cooking device 25 is mounted on the case 11. An illuminating lamp 27 is mounted in the cooking device 25. A horn 29 and a chime 31 are mounted on the cooking device 25. A plurality of person sensors 33 are attached to a front side and lateral sides of the case 11. The person sensors 33 use supersonic ultrasonic waves or infrared rays. The person sensors 33 sense a person or persons in a predetermined area in the vicinity of the dispenser to produce a signal indicative of the sensed person or persons. A plurality of selecting buttons 35 and selecting lamps 37 are attached to the front side of the case 11. The selecting buttons 35 are for selecting kinds of popcorn from among several flavors available to be served. A sale indicating lamp 39 is attached to the front side of the case 11. Further mounted in the front side of the case 11 are a coin slot 41 and a popcorn spout 43 which is movable. A released popcorn sensor 45 is attached to the popcorn spout 43. The released popcorn sensor 45 senses release of popcorn through the popcorn spout 43 to produce a signal indicative of the release of popcorn. Two loudspeakers 47 are attached to the front side of the case 11. A start button 49 and a stop button 51 are attached to a lateral side of the case Referring to FIG. 2, the popcorn dispenser comprises the doll 13, a doll driving device 53, a doll controlling device 55, a person sensing device 57, a money receiving device 59, a selecting device 61, a lamp driving device 63, a corn processing device 65, a corn harvesting device 67, a sound producing device 69, a read only memory (ROM) 71, and a central processing unit (CPU) 73. The ROM 71 stores a control program. The CPU 73 controls the operation of the whole popcorn dispenser in response to the control program of the ROM 71.

Figure 2:
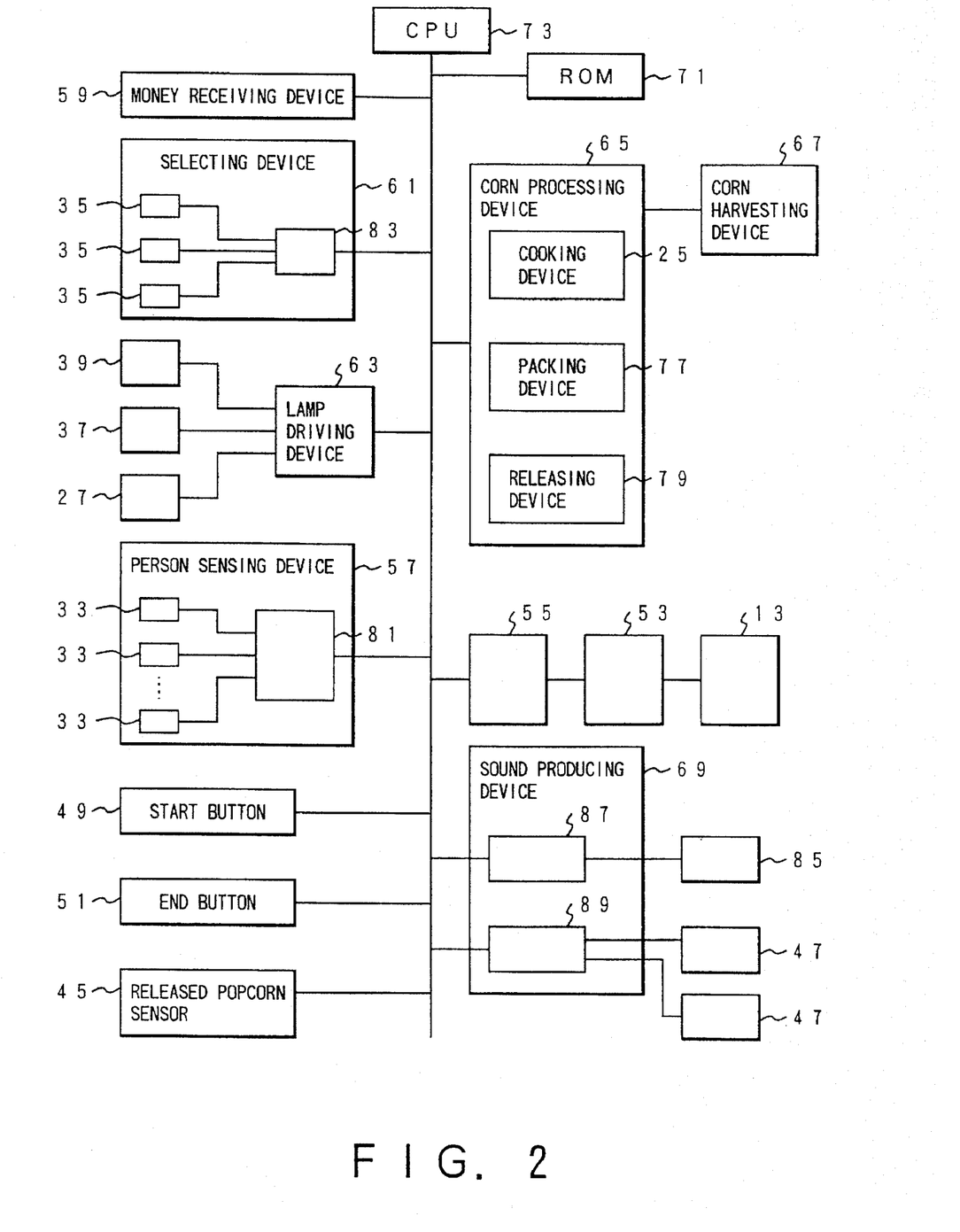
FIG. 2 is a block diagram of a control system of the dispenser of FIG. 1.

The doll driving device 53, the doll controlling device 55, the person sensing device 57, the money receiving device 59, the selecting device 61, the lamp driving device 63, the corn harvesting device 67, and the sound producing device 69 are located in the case 11 and are connected to the CPU 73. The CPU 73 and the ROM 71 are also located in th6 case 11. The ROM 71 is connected to the CPU 73. The corn processing device 65 comprises 5 the cooking device 25, a packing device 77 and a releasing device 79. The cooking device 75 is connected to the corn harvesting device 67 and the CPU 73. The packing device 77 is connected to the cooking device 75 and the CPU 73. The releasing device 79 is connected to the packing device 77 and the CPU 73. The packing device 77 and the releasing device 79 are located in the case 11.

The person sensing device 57 comprises the person sensors 33 and a sensed person signal producing device 81 connected to the person sensors 33. The sensed person signal producing device 81 is supplied with signals from the person sensors 33 and produces a sensing signal indicative of the sensor person or persons to supply the sensed person signal to the CPU 73.

The selecting device 61 comprises the selecting buttons 35 and a selecting signal producing device 83. The selecting signal producing device 83 is supplied with signals from the selecting buttons 35 and produces a selecting signal indicating a selected kind of popcorn from among several flavors offered by the dispenser. For example, the popcorn may be butter, cheese or salt flavored. The selecting signal producing device 83 supplies the selecting signal to the CPU 73.

The lamp driving device 63 is connected to the illuminating lamp 27, the selecting lamps 37 and the sale indicating lamp 39 to drive the illuminating lamp 27, the selecting lamps 37 and the sale indicating lamp 39. The start button 49 is connected to the CPU 73 and produces and supplies a start command signal to the CPU 73. The stop button 51 is connected to the CPU 73 and produces and supplies a stop command signal to the CPU 73.

The doll driving device 53 is coupled to the doll 13 to drive the doll 13. The doll controlling device 55 is connected to the doll driving device 53, the person sensing device 57 and the CPU 73. The doll controlling device 55 controls the doll driving device 53 to make the doll 13 face the person in response to the sensed person signal and to make the doll 13 carry out movements for selling a popcorn or popcorns. The doll driving device 53 is adapted to drive various parts of the doll 13 separately from each other under control by controlling device 55. The money receiving receives coins through the coin slot 41 and counts the coins to produce and supply a money receipt it signal when it has counted up to an amount commensurate to a selected popcorn, to the CPU 73 and the cooking device 75. The corn harvesting device 67 harvests or picks up corn of the kind selected by one of the selecting buttons 35.

The cooking device 75 cooks the corn by means of an electronic oven or the like from the corn harvesting device 67 to impart to the selected corn a flavor which is selected by the selecting device 61 when the cooking device 75 is supplied with the money receipt signal and the selecting signal. The cooking device 75 has illuminator means (not shown) for illuminating the inside of the oven during cooking. When the cooking device 75 completes cooking of corn, the cooking device 75 produces a cooking completion signal. The packing device 77 packs the cooked popcorn from the cooking device 75 into a package as popcorn. The releasing device releases the packed popcorn from the packing device to the popcorn spout 43. The releasing device 79 has a motor (not shown) which drives the popcorn spout 43 to open after the releasing device 79 releases the packed popcorn into the spout 43. When the packed popcorn is taken out from the popcorn taking port 43 by a person, the popcorn spout 43 closes due to its own weight. The released popcorn sensor 45 is connected to the CPU 73 and supplies the released popcorn signal to the CPU 73. The sound producing device 69 produces sounds that are useful for a person to buy popcorn. The CPU 73 controls the sound producing device 69 in response to the control program of the ROM. 71. The sound producing device 69 comprises a compact disk (CD) or a mini disk (MD) 85, a disk driving device 87, loudspeakers 41 and a speaker driving device 89. The CD 85, the disk driving device 87 and the speaker driving device 89 are located in the case 11. The disk driving device 87 is connected to the CD 85 and the CPU 73. The speaker driving device 89 is connected to the disk driving device 87, the loudspeakers 47 and the CPU 73. The CD 85 has two channels, i.e., a left channel and a right channel, one of which stores sound information which comprises music information, and the other channel voice information representing sale data (narration data), the music information and the voice information corresponding to the respective block addresses. The disk driving device 87 reads out the sound information and/or voice information from one or more of the block addresses of the CD 85 which is selected by the CPU 73 to supply a sound signal to the speaker driving device 89. The speaker driving device 89 drives the loudspeakers 47 in response to the sound signal to produce sounds.

The doll controlling device 55 is connected to the disk driving device 87. The doll controlling device 55 is also supplied with the sound signal from the disk driving device 87, in response to which the doll controlling device 55 controls the doll driving device 53 to make the doll 13 carry out movement for selling popcorn. Namely, the doll controlling device 55 controls the doll driving device 53 to make the doll 13 move the eyes, the eyelids, the waist, the neck, the shoulder, the elbow, the wrist and/or the fingers in response to the sound signal. For example, the mouth of the doll 13 is controlled to open and close in response to the sound signal based on the narration data, so that the doll 13 appears to speak. As a result, a person in the predetermined area feels as if the doll 13 speaking to him. The doll controlling device 55 is supplied with the cooking completion signal from the cooking device, in response to which the doll controlling device 55 controls the doll driving device 53 to make the right hand of the doll 13 strike the chime 31. A person sensor 91 (FIG. 1) may be attached to the breast of the doll 13. In this case, the person sensor 91 may move with the doll 13.

Figure 3:
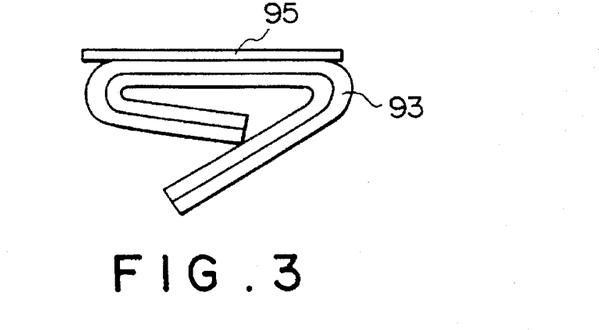
FIG. 3 is a side view of a package bag in a folded state for use in the dispenser of FIG. 1.
Figure 4:
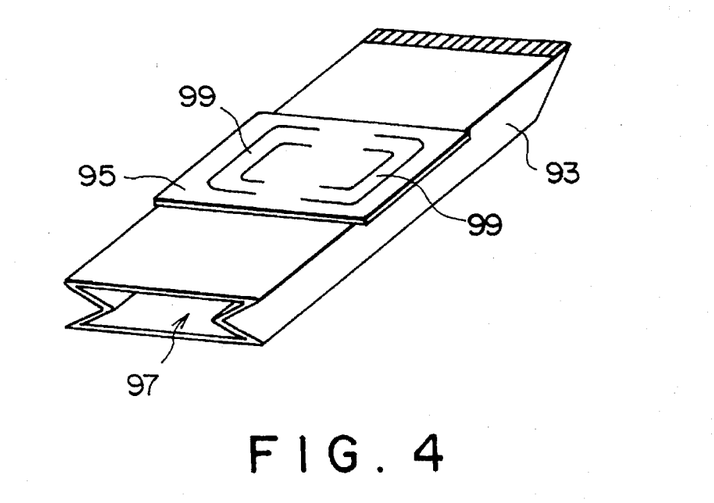
FIG. 4 is a side view of the package of FIG. 3 in an unfolded state.
Figure 5:
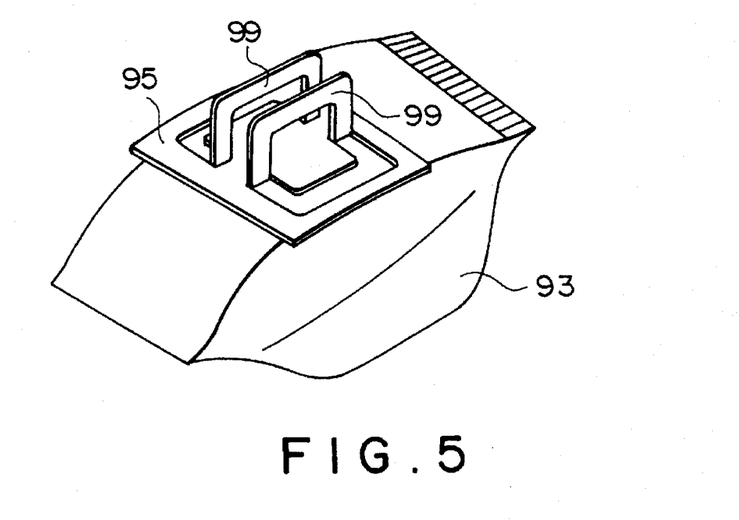
FIG. 5 is a perspective view of the bag of FIG. 3 in a packed state.

FIG. 3 is a side view of a package 93 for use in the popcorn dispenser. The package 93 shown in FIG. 3 is in a folded state. The package 93 has a base paper 95 stuck to the package 93. Referring to FIG. 4, the package 93 has an opening 97 at one end thereof, through which the packing device 77 packs the popcorn into the package 93 after unfolding the package 93 into an unfolded state shown in FIG. 4. The other end of the package 93 is previously closed. Referring to FIG. 4 and FIG. 5, the base paper 95 has two grips 99 which are formed by cuts in the paper 95 along their peripheries to be held by a hand of the person after being raised up. rig. 5 shows the package 93 which contains popcorn and is closed at the opening 97. Instead of releasing the package 93 containing popcorn into the spout 43, it may be so arranged that the doll 13 carries the package 93 by the grips 99 into the spout 43.

Figure 6:
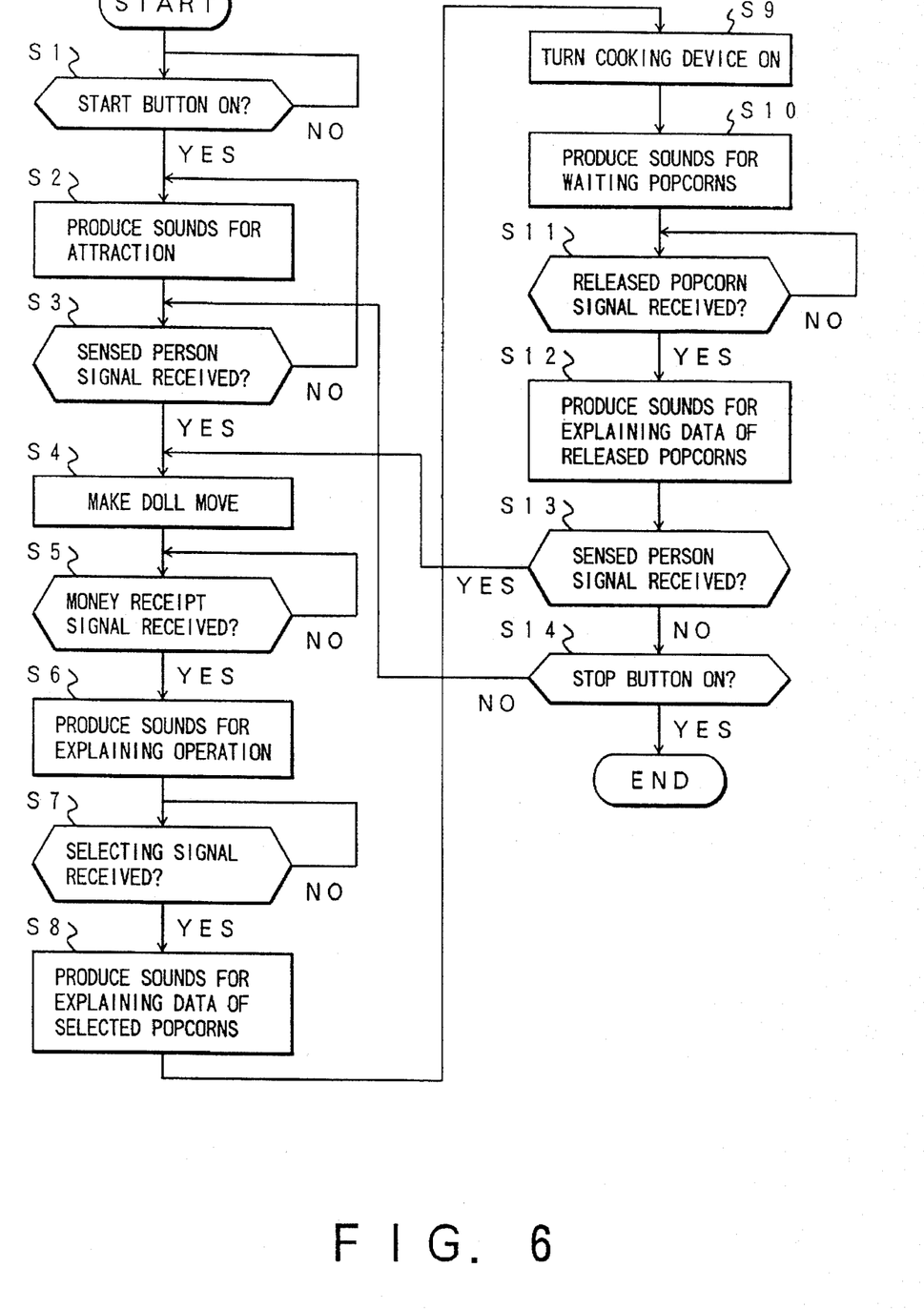
FIG. 6 is a flowchart useful in explaining the operation of the dispenser of FIG. 1.

Referring to FIG. 6 together with FIG. 1 and FIG. 2, the operation of the popcorn dispenser will be described in detail. In FIG. 6, a step S1 determines whether or not the start button 51 is ON. When the start button 51 is ON, the program proceeds from the step S1 to a step S2. Otherwise, the program returns to the step S1. At the step S2, the sound producing device 69 is driven to produce sounds for attraction such as a music or voice (narration). For example, the speaker driving device 89 causes the loudspeakers 47 to generate narrations such as "Hello, are you feeling fine? The popcorn is fine, too. Come on over.", "Now, let's listen to music", "Which popcorn do you like? Insert coins and push a button", "Have you decided?" "Let's have some buttered popcorn!", and "In 1920, in America . . . ". At the same time, the doll controlling device 55 controls the doll driving device 53 to make the doll 13 move its various parts. For example, the doll 13 is driven to open and close the mouth and the eyelids at random, and make movements of the eyes, the right hand and the waist in predetermined manners. For example, the doll 13 grips the toy mike 15 by the left hand. The left wrist and shoulder of the doll 13 follows the motion of the left hand through free joints connecting therebetween. A step S3 follows the step S2 to determine whether or not the sensed person signal has been received. When the sensed person signal has been received, the program proceeds to a step S4. Otherwise, the step S2 is repeated again to continue producing the sound for attraction.

At the step S4, the doll controlling device 55 controls the doll driving device 53 to make the face and waist of the doll 13 progressively face in the direction of the person sensing sensor 33 which has detected a person. By these movements, the doll 13 appears to be speaking to the person in the vicinity of the dispenser to thereby attract his interest. When the person sensing device 57 senses a plurality of persons at the same time, the doll controlling device 55 may make the doll 13 consecutively face the persons one after another at fixed time intervals (e.g., 5 sec.). A step S5 follows the step S4 to determine whether or not the money receipt signal has been received. When the money receipt signal has been received, the program proceeds to a step S6. Otherwise, the step S5 is repeated again.

At the step S6, the sound producing device 69 is driven to produce sounds for explaining operation. More specifically, upon receipt of the money receipt signal, the CPU 73 designates a block address corresponding to the operation explanation data to the disc driving device 87 which reads out information on the operation explanation data and delivers a sound signal to the loudspeaker driving device 89 to generate through the loudspeakers 47 a narration such as "If you have chosen a popcorn, push the button". A step S7 follows the step S6 to determine whether or not the selecting signal has been received. When the selecting signal has been received, the program proceeds to a step S8. Otherwise, the step S7 is repeated again. At the step S8, the sound producing device 69 is driven to produce sounds for explaining data of the selected popcorn. At the same time, the CPU 73 drives the lamp driving device 63 to light one of the selecting lamps 37 corresponding to the pushed button 35 and keep off the other selecting lamps corresponding to the non-selected buttons 35. The CPU 73 designates a block address corresponding to the selected popcorn explanation data to the disc driving device 87 which reads out information on the selected popcorn explanation data and delivers a sound signal to the loudspeaker driving device 89 to generate through the loudspeakers 47 a narration such as "You have chosen cheese flavored popcorn, haven't you?" A step S9 follows the step S8 to make the cooking device 75 cook the corn. During step S10 following the step S9, the sound producing device 69 produces sounds to entertain the person waiting for popcorn. More specifically, similarly to the above described operations, the loudspeaker driving device 89 generates through the loudspeakers 47 a music and a narration corresponding to addressed music and narration information to be played while waiting for popcorn to be served, until the selected popcorn is served, so that the person does not feel ennui, such as "Now, let's start popping. Meanwhile, let's listen to music. You should know this music? OH, it was already popular 100 years ago! Have you ever heard it?" At the same time, the doll controlling device 55 controls the doll driving device 53 to make the doll 13 move its various parts in a predetermined manner. For example, the doll 13 sounds the horn 110 at the start of cooking, and strikes the chime 111 upon completion of the cooking. The doll 13 behaves as if it, is listening to music, with its eyelids closed during playback. The cooking device 25 cooks corn from the corn harvesting device 67 by heating it for a predetermined time period, and the cooked popcorn is packed into a package 93 by the packing device 77, followed by the packed popcorn being released into the spout 43 by the releasing device 79.

A step S11 follows the step S10 to determine whether or not the released popcorn signal has been received. When the released popcorn signal has been received, the program proceeds to a step S12. Otherwise, the step S11 is repeated again.

At the step S12, the sound producing device 69 is driven to produce sounds for explaining data of the released popcorn. More specifically, similarly to the above described operations, the loudspeaker driving device 89 generates through the loudspeakers 47 a music and a narration corresponding to addressed music and narration information for explaining the released popcorn, such as "The popcorn is now ready. It's hot just from the oven, so be careful not to burn your hand! Hold it carefully.", "Slowly open the upper opening a little later", "It's been just completed and so taste good! It'll eat crisp and taste better in five minutes or so.", and "Now, let's enjoy music!".

A step S13 follows the step S12 to determine whether or not the sensed person signal has been received. When the sensed person signal has been received, the program returns to the step S4. Otherwise, the program proceeds to a step S14. The step S14 determines whether or not the end button 51 is ON. When the end button 51 is ON, the operation of the device is terminated. Otherwise, the program returns to the step S13.

The program may be so constructed that the doll controlling device 55 does not always make the doll 13 face the person. Also, the popcorn dispenser may comprise a robot animal such as a bear or a panda instead of the doll 13.

This invention may be applied to dispensers for other foods or drinks.

According to another embodiment of this invention, the dispenser for foods or drinks comprises: the doll 13 movable for selling foods or drinks; the doll driving device 53 coupled to the doll 13 for driving the doll 13; the doll controlling device 55 connected to the doll driving device 53 for controlling the doll driving device 53 to make the doll 13 carry out movement for selling the foods or drinks; the money receiving device 59 for receiving money to produce the money receipt signal; a food or drink harvesting device (not shown) for harvesting or picking up foods or drinks which are to be packed; the selecting device 61 for producing the selecting signal which selects one of the foods or drinks; the releasing device 79 connected to the money receiving device 59, the food or drink harvesting device and the selecting device 61 for releasing the selected one of the foods or drinks from the food or drink harvesting device when the releasing device 79 is supplied with the money receipt signal and the selecting signal; and the sound producing device 69 for producing sounds of voice which are useful for selling the foods or drinks.

According to a further embodiment of this invention, the dispenser for foods or drinks comprises: the doll 13 movable for selling foods or drinks; the doll driving device 53 coupled to the doll 13 for driving the doll 13; the doll controlling device 55 connected to the doll driving device 53 for controlling the doll driving device 53 to make the doll 13 carry out movement for selling the foods or drinks; the money receiving device 59 for receiving money to produce the money receipt signal; the food or drink harvesting device for harvesting the foods or drinks; the selecting device 61 for producing the selecting signal which selects one of the foods or drinks; the cooking device 75 connected to the money receiving device 59, the food or drink harvesting device and the selecting device 61 for cooking the selected one of the foods or drinks from the food or drink harvesting device when the cooking device 75 is supplied with the money receipt signal and the selecting signal; the packing device 77 connected to the cooking device 75 for packing the selected one of the foods or drinks from the cooking device 75 into the package as a packed food or drink; the releasing device 79 connected to the packing device 77 for releasing the packed food or drink from the packing device; and the sound producing device 69 for producing sounds of voice which are useful for selling the foods or drinks.

According to a still further embodiment of this invention, the dispenser for foods or drinks comprises: the doll 13 movable for selling foods or drinks; the doll driving device 53 coupled to the doll 13 for driving the doll 13; the person sensing device 57 for sensing a person in a predetermined area to produce the person sensing signal; the doll controlling device 55 connected to the doll driving device 53 and the person sensing device 57 for controlling the doll driving device 53 to make the doll 1:3 face the person in response to the sensed person signal and to make the doll 13 carry out movement for selling the foods or drinks; the money receiving device 59 for receiving money to produce the money receipt signal; the food or drink harvesting device for harvesting the foods or drinks which are to be packed; the selecting device 61 for producing the selecting signal which selects one of the foods or drinks; the releasing device 79 connected to the money receiving device 59, the food or drink harvesting device, and the selecting device 61 for releasing the selected one of the foods or drinks from the food or drink harvesting device when the releasing device 79 is supplied with the money receipt signal and the selecting signal; and the sound producing device 69 for producing sounds of voice which are useful for selling the foods or drinks.

According to a yet further embodiment of this invention, the dispenser for foods or drinks comprises: the doll 13 movable for selling foods or drinks; the doll driving device 53 coupled to the doll 13 for driving the doll 13; the person sensing device 57 for sensing the person in a predetermined area to produce the sensed person signal; the doll controlling device 55 connected to the doll driving device 53 and the person sensing device 57 for controlling the doll driving device 53 to make the doll 13 face the person in response to the sensed person signal and make the doll 13 carry out movement for selling the foods or drinks; the money receiving device 59 for receiving money to produce the money receipt signal; the food or drink harvesting device for harvesting the foods or drinks; the selecting device 61 for producing the selecting signal which selects one of the foods or drinks; the cooking device 75 connected to the money receiving device 59, the food or drink harvesting device and the selecting device 61 for cooking the selected one of the foods or drinks from the food or drink harvesting device when the cooking device is supplied with the money receipt signal and the selecting signal; the packing device 77 connected to the cooking device 75 for packing the selected one of the foods or drinks from the cooking device into the package as the packed food or drink; the releasing device 79 connected to the packing device 77 for releasing the packed food or drink from the packing device 77; and the sound producing device 69 for producing sounds of voice which are useful for selling the foods or drinks.

According to this invention described above, movement of the doll responsive to generation of sounds such as a voice narration attracts a person's interest, which contributes to sales promotion. Further, generation of sounds such as music and voice during cooking prevents a person waiting for foods or drinks from feeling ennui until a food or a drink is served.

Moreover, the doll appears as if it is speaking to the person, which further contributes to the sales promotion.

What is claimed is:

1. A dispenser for foods or drinks comprising:
   (a) a doll movable for selling foods or drinks; a doll driving device coupled to said doll for driving said doll;
   (b) a controlling device connected to said doll driving device for controlling said doll driving device to make said doll carry out movement for selling the foods or drinks;
   (c) money receiving means for receiving money to produce a money receipt signal;
   (d) food or drink harvesting means for harvesting the foods or drinks;
   (e) a selecting device for producing a selecting signal which selects one of the foods or drinks;
   (f) a food or drink releasing device connected to said money receiving means, said food or drink harvesting means, and said selecting device, for releasing the selected one of the foods or drinks from said food or drink harvesting means when said food or drink releasing device is supplied with said money receipt signal and said selecting signal; and
   (g) a sound producing device for producing sounds of voice which are useful for selling the foods or drinks.

2. A dispenser for foods or drinks comprising:
   (a) a doll movable for selling foods or drinks;
   (b) a doll driving device coupled to said doll for driving the doll;
   (c) a controlling device connected to said doll driving device for controlling said doll driving device to make said doll carry out movement for selling the foods or drinks;
   (d) money receiving means for receiving money to produce a money receipt signal;
   (e) food or drink harvesting means for harvesting the foods or drinks;
   (f) a selecting device for producing a selecting signal which selects one of the foods or drinks;
   (g) a cooking device connected to said money receiving means, said food or drink harvesting means, and said selecting device for cooking the selected one of the foods or drinks from said food or drink harvesting means when said cooking device is supplied with said money receipt signal and said selecting signal;
   (h) a packing device connected to said cooking device for packing the selected one of the foods or drinks from said cooking device into a package as a packed food or drink; and
   (i) a food or drink releasing device connected to said packing device for releasing the packed food or drink from the packing device, and a sound producing device for producing sounds of voice which are useful for selling the foods or drinks.

3. A dispenser for foods or drinks comprising:
   (a) a doll movable for selling foods or drinks;
   (b) a doll driving device coupled to said doll for driving said doll;
   (c) a person sensing device for sensing a person in a predetermined area to produce a sensed person signal;

(d) a controlling device connected to said doll driving device and said sensed person device for controlling said doll driving device to make said doll face said person in response to said sensed person signal and to make said doll carry out movement for selling the foods or drinks;

(e) money receiving means for receiving money to produce a money receipt signal;

(f) food or drink harvesting means for harvesting the foods or drinks;

(g) a selecting device for producing a selecting signal which selects one of the foods or drinks;

(h) a food or drink releasing device connected to said money receiving means, said food or drink harvesting means, and said selecting device for releasing the selected one of the foods or drinks from said food or drink harvesting means when the food or drink releasing device is supplied said the money receipt signal and the selecting signal; and (i) a sound producing device for producing sounds of voice which are useful for selling the foods or drinks.

4. A dispenser for foods or drinks comprising;

(a) a doll movable for selling foods or drinks;

(b) a doll driving device coupled to said doll for driving said doll;

(c) a person sensing device for sensing a person in a predetermined area to produce a sensed person signal;

(d) a controlling device connected to said doll driving device and said person sensing device for controlling said doll driving device to make said doll face said person in response to said sensed person signal and make said doll carry out movement for selling the foods or drinks;

(e) money receiving means for receiving money to produce a money receipt signal;

(f) food or drink harvesting means for harvesting the foods or drinks;

(g) a selecting device for producing a selecting signal which selects one of the foods or drinks;

(h) a cooking device connected to said money receiving means, said food or drink harvesting means, and said selecting device for cooking the selected one of the foods or drinks from said food or drink harvesting means when said cooking device is supplied with said money receipt signal and said selecting signal;

(i) a packing device connected to said cooking device for packing the selected one of the foods or drinks from said cooking device into a package as a packed food or drink;

(j) a food or drink releasing device connected to said packing device for releasing the packed food or drink from said packing device; and (k) a sound producing device for producing sounds of voice which are useful for selling the foods or drinks.

5. A popcorn dispenser comprising:

(a) a doll movable for selling popcorn;

(b) a doll driving device coupled to said doll for driving said doll;

(c) a controlling device connected to said doll driving device to make said doll carry out movement for selling popcorn;

(d) money receiving means for receiving money to produce a money receipt signal;

(e) corn harvesting means for harvesting corn;

(f) a selecting device for producing a selecting signal which selects popcorn which have one of tastes;

(g) a cooking device connected to said money receiving means, said corn harvesting means, and said selecting device for cooking corn from said corn harvesting means to make selected popcorn having i taste which is selected by said selecting device when said cooking device is supplied with said money receipt signal and said selecting signal;

(h) a packing device connected to said cooking device for packing said selected popcorn from said cooking device into a package as a packed popcorn;

(i) a popcorn releasing device connected to said packing device for releasing the packed popcorn from said packing device; and (j) a sound producing device for producing sounds of voice which are useful for selling the popcorn.

6. A popcorn dispenser comprising:

(a) a doll movable for selling popcorn;

(b) a doll driving device coupled to said doll for driving said doll;

(c) a person sensing device for sensing a person in a predetermined area to produce a sensed person signal;

(d) a controlling device connected to said doll driving device and said sensed person device for controlling said doll driving device to make said doll face said person in response to said sensed person signal and to make said doll carry out movement for selling the popcorn;

(e) money receiving means for receiving money to produce a money receipt signal;

(f) corn harvesting means for harvesting corn; a selecting device for producing a selecting signal which selects popcorn which have one of tastes; a cooking device connected to said money receiving means, said corn harvesting means, and said selecting device for cooking corn from said corn harvesting means to make selected popcorn having a taste which is selected by said selecting device when said cooking device is supplied with said money receipt signal and said selecting signal;

(g) a packing device connected to said cooking device for packing said selected popcorn from said cooking device into a package as a packed popcorn;

(h) a popcorn releasing device connected to said packing device for releasing the packed popcorn from said packing device; and (i) a sound producing device for producing sounds of voice which are useful for selling the popcorn.

* * * * *